US007073717B1

(12) United States Patent
Arnold et al.

(10) Patent No.: US 7,073,717 B1
(45) Date of Patent: Jul. 11, 2006

(54) PORTABLE PRINTER AND DATA ENTRY DEVICE CONNECTED THERETO ASSEMBLY

(75) Inventors: Gregory B. Arnold, Centerville, OH (US); Dennis S. Prows, Cincinnati, OH (US)

(73) Assignee: Paxar Americas, Inc., Miamisburg, OH (US)

( * ) Notice: Subject to any disclaimer, the term of this patent is extended or adjusted under 35 U.S.C. 154(b) by 1084 days.

(21) Appl. No.: 09/384,675

(22) Filed: Aug. 27, 1999

(51) Int. Cl.
*G06K 7/10* (2006.01)
*G06F 15/12* (2006.01)
*G06F 3/12* (2006.01)
*B41J 3/36* (2006.01)
*B41J 29/02* (2006.01)
*B41J 2/325* (2006.01)
*G01D 15/10* (2006.01)

(52) U.S. Cl. .................. 235/472.01; 235/432; 400/88; 400/693; 347/222

(58) Field of Classification Search ................ 235/432, 235/454, 462.01, 462.13, 462.43, 462.45, 235/462.47, 472.01, 462.46; 400/692, 693, 400/691, 88; 347/222, 109
See application file for complete search history.

(56) References Cited

U.S. PATENT DOCUMENTS

| | | | | |
|---|---|---|---|---|
| D245,200 | S | | 7/1977 | Packard |
| 4,727,245 | A | * | 2/1988 | Dobbins et al. ........ 235/432 X |
| 4,734,710 | A | * | 3/1988 | Sato et al. .............. 235/432 X |
| 4,746,932 | A | | 5/1988 | Sato |
| 4,788,658 | A | | 11/1988 | Hanebuth |
| 5,047,615 | A | * | 9/1991 | Fukumoto et al. .......... 235/432 |
| 5,057,676 | A | * | 10/1991 | Komaki ...................... 235/432 |
| 5,110,226 | A | * | 5/1992 | Sherman et al. .............. 400/88 |
| 5,111,216 | A | * | 5/1992 | Richardson et al. .... 235/432 X |
| 5,142,131 | A | * | 8/1992 | Collins, Jr. et al. ..... 235/462.46 |
| 5,186,558 | A | * | 2/1993 | Sherman et al. ............ 400/692 |
| 5,237,487 | A | * | 8/1993 | Dittmer et al. ............. 361/729 |
| 5,371,348 | A | * | 12/1994 | Kumar et al. ....... 235/462.47 X |
| 5,468,947 | A | | 11/1995 | Danielson et al. |
| 5,483,624 | A | | 1/1996 | Christopher et al. ....... 358/1.18 |
| 5,486,259 | A | * | 1/1996 | Goodwin et al. ........... 156/384 |
| 5,488,558 | A | | 1/1996 | Ohki |
| 5,541,398 | A | * | 7/1996 | Hanson ................. 235/462.46 |
| 5,679,943 | A | * | 10/1997 | Schultz et al. ......... 235/472.02 |
| 5,808,283 | A | * | 9/1998 | Stanton et al. .......... 235/432 X |
| 5,816,725 | A | * | 10/1998 | Sherman et al. .... 235/472.01 X |
| 5,930,770 | A | * | 7/1999 | Edgar ................ 235/462.43 X |
| 5,969,319 | A | * | 10/1999 | Wallner ....................... 235/380 |

(Continued)

FOREIGN PATENT DOCUMENTS

| | | |
|---|---|---|
| EP | 0 191 495 | 8/1986 |

(Continued)

OTHER PUBLICATIONS

Texas Instruments Inc., Portable electronic calculator with inbuilt thermal printer, Mar. 1, 1984, translation of abstract only of NL 174772 B, from Derwent database.*

(Continued)

*Primary Examiner*—Jared J. Fureman
(74) *Attorney, Agent, or Firm*—Joseph J. Grass

(57) ABSTRACT

There is disclosed an assembly of a portable data entry device and a portable printer. The printer is hand-held and carries the data entry device. The data entry device includes a scanner and is located at the front portion of the printer. The printer has a space for accommodating a label roll and a print module which are located at the rear portion of the printer.

40 Claims, 2 Drawing Sheets

U.S. PATENT DOCUMENTS

| | | | | |
|---|---|---|---|---|
| 6,010,067 | A | 1/2000 | Elbaum | |
| 6,068,420 | A * | 5/2000 | Austin et al. | 400/693 |
| 6,195,589 | B1 | 2/2001 | Ketcham | |
| 6,202,642 | B1 * | 3/2001 | McKinnon et al. | 128/200.23 |
| 6,270,271 | B1 * | 8/2001 | Fujiwara | 400/693 |

FOREIGN PATENT DOCUMENTS

| | | | |
|---|---|---|---|
| EP | 0 199 252 | | 10/1986 |
| EP | 0 200 945 | | 11/1986 |
| EP | 0 250 910 | | 1/1988 |
| JP | 5-108522 | * | 4/1993 |
| JP | 11138911 A | | 5/1999 |
| JP | 2000025304 A | | 1/2000 |
| JP | 2002-151858 A | * | 5/2002 |

OTHER PUBLICATIONS

Symbol Technologies, Inc. manual entitled SPT 1500, pp. 1 through 20, Copyright Jun. 1998.

Symbol Technologies, Inc. internet site, Product Information, SPT 1500 Palm Terminal Series, pp. 1 through 3, Mar. 23, 1999.

Axiohm Thermal Printer Mechanism, User's Manual THTP Series, Preliminary Issue, reference 3104660-FDE, Oct. 1998.

* cited by examiner

PORTABLE PRINTER AND DATA ENTRY DEVICE CONNECTED THERETO ASSEMBLY

BACKGROUND OF THE INVENTION

1. Field of the Invention

This invention relates to the fields of portable printers and portable data entry devices.

2. Brief Description of the Prior Art

The following prior art is made of record: U.S. Pat. Nos. 5,486,259 and 5,483,624; Symbol Technologies, Inc. manual entitled SPT 1500, pages 1 through 20, Copyright 1998; Symbol Technologies, Inc. internet site, Product Information, SPT 1500 Palm Terminal Series, pages 1 through 3, Mar. 23, 1999; Axiohm Thermal Printer Mechanism, User's Manual THTP Series, Preliminary Issue, reference 3104660-FDE, October 1998.

SUMMARY OF THE INVENTION

The invention relates to a portable printer which can be coupled to a portable data entity device, and when so coupled the combination is a portable assembly which in general can be conveniently carried from place-to-place and which in particular is hand held.

The invention relates to an improved lightweight, portable, hand-held, user-friendly printer for reception of a lightweight, portable hand-held, user-friendly data entry device, and to a combination of such a printer and such a data entry device.

A specific embodiment of the printer includes an elongate hand-held housing having a front portion which has a compartment or pocket for receiving a data entry device. The housing also has a rear portion. There is space at the rear portion for receiving a roll of a label web. A print module or mechanism is disposed at the rear portion for printing on the label web, and the print module including a thermal print head and a platen roll cooperable with the print head. It is preferred that the housing compartment have an open top for access to the data entry device. The platen roll is preferably mounted on a cover for an access opening to the label roll space. A set of batteries and the print module are preferably mounted on an elongate circuit board disposed in the printer housing. The batteries are preferably located at the front portion of the printer housing. The compartment is preferably open-fronted and is channel-shaped for slidably receiving the data entry device.

BRIEF DESCRIPTION OF THE DIAGRAMMATIC DRAWINGS

Figure 5:
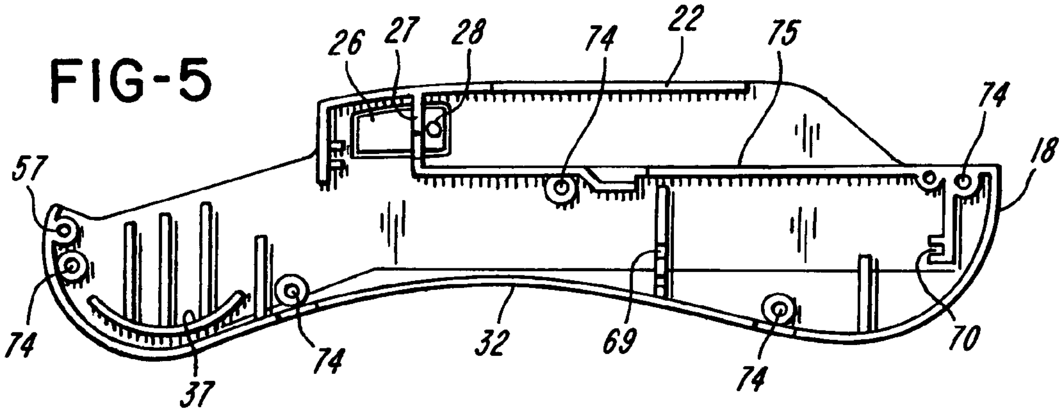
Figure 6:
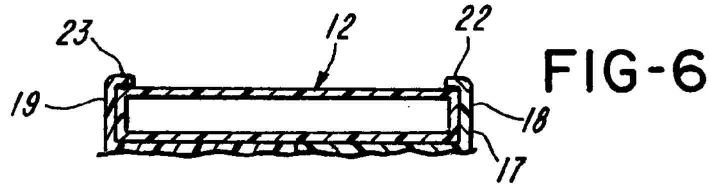
Figure 7:
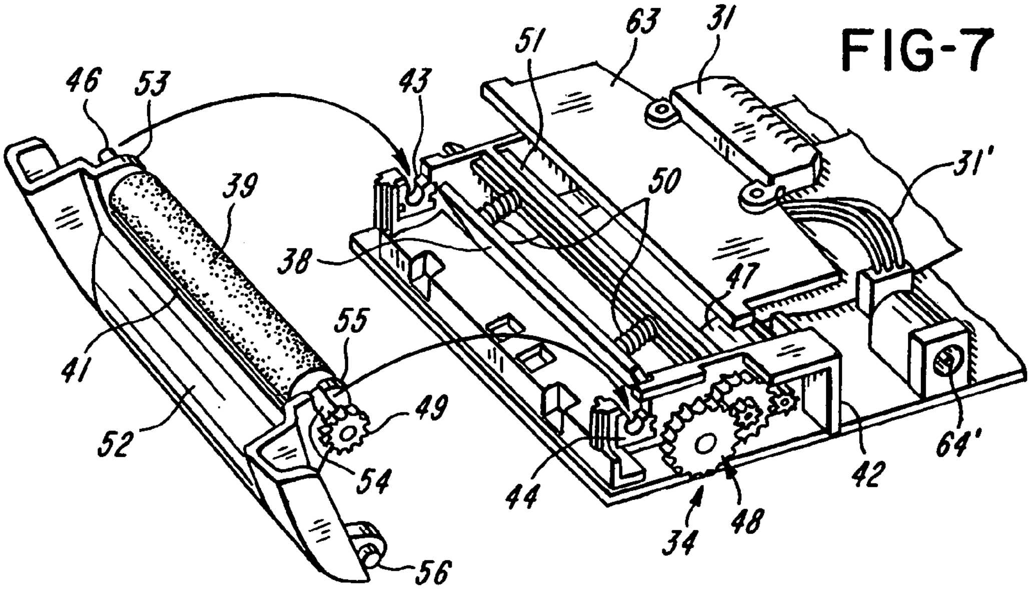

FIG. 5 in an elevational view of one of the two mirror-image housing sections;

FIG. 6 is a fragmentary sectional view illustrating the channel shape of the compartment for receiving the portable data entry device; and FIG. 7 is a fragmentary perspective view of the print module and the cover and the platen roll mounted by the cover.

DETAILED DESCRIPTION OF THE PREFERRED EMBODIMENT

Figure 1:
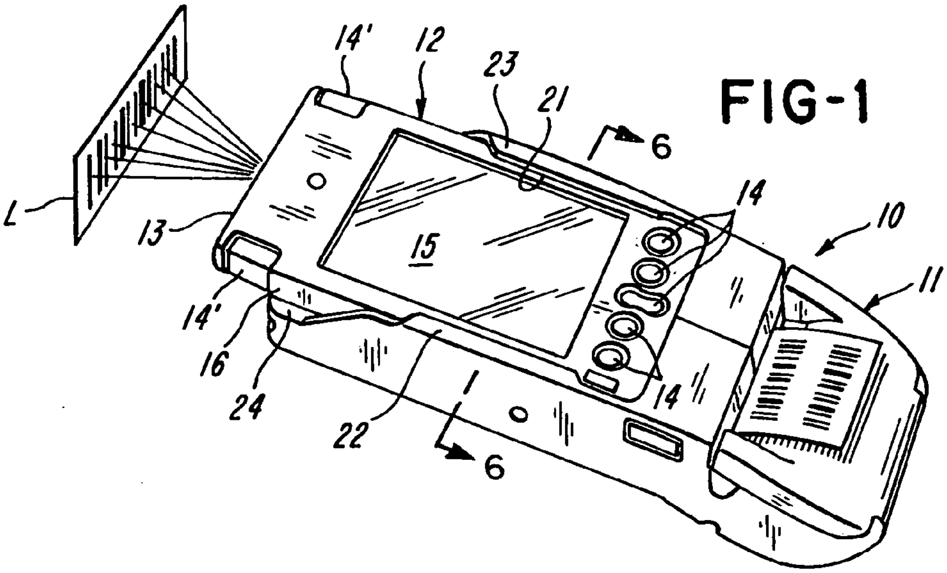
FIG. 1 is a perspective view of an assembly of a portable printer and portable data entry device, which is hand-held and portable, showing the portable data entry device scanning a bar-coded label.

With reference to FIG. 1, there is shown an assembly generally indicated at 10 of a portable printer generally indicated at 11 and a portable data entry device generally indicated at 12. The printer 11 and the device 12, individually, as well as the assembly 10 are portable and in particular are hand-held for ease of use. The device 12 includes a scanner 13 at its front end for scanning a bar-coded label L. The device 12 also has manually operable keys 14 and a display 15. The scanner 13, the keys 14 and the display 15 are housed in an elongate relatively thin housing 16. Manually depressing buttons 14' operates the scanner 13.

The printer 11 is shown to have an elongate housing 17 having opposed mirror-image housing sections 18 and 19. The front portion of the housing 17 has a compartment or space or pocket 20 for receiving and releasably holding the data entry device 12. The compartment 20 has an open top 21 to enable the keys to be operated and to enable the display 15 to be seen. The compartment 20 is channel-shaped as diagrammatically depicted in FIG. 6 to capture the data entry device 12. As shown, the housing 17 has flanges 22 and 23 which help retain the device 12 captive in the compartment 20. The front end of the compartment 20 is open as indicated at 24 to enable the device 12 to be slid into the compartment 20.

The device 12 is releasably latched in the compartment 20 by opposed latches 25. The latches 25 are each comprised of a pad 26 flexibly secured to a wall 27. The pads 26 have opposed projections 28 which are received in recesses 29 in the housing 16 of the device 12. By simultaneously depressing both pads 26 rearwardly of the wall 27, the projections 28 are withdrawn from the recesses 29 which allows the device 12 to be slid out of the compartment 20.

The underside of the device 12 has a 10-pin connector 30 which cooperates with a mating 10-pin connector 31 on the housing 17. As the device 12 is slid into the compartment 20 in the direction of arrow A in FIG. 2, the connector 30 at the rear end of the device 12 connects with the connector 31 at the rear end of the compartment 20, thereby enabling the data entry device 12 to control the printer 11. The latches 25 are latched when the connectors 30 and 31 are connected.

Figure 3:
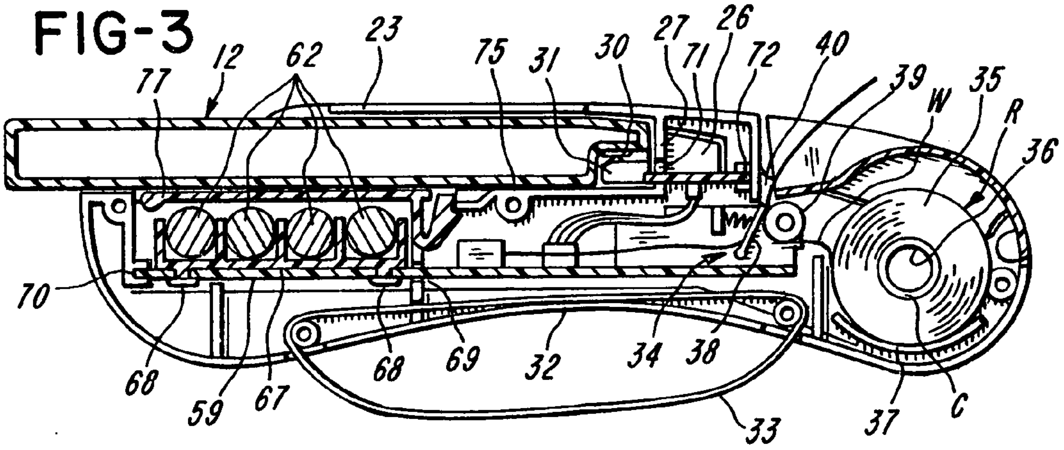
FIG. 3 is a generally vertical sectional view of the assembly shown in FIG. 1.

As is apparent from FIG. 3, the underside of the printer housing 17 has a hollow or concave surface 32 for receiving the palm of the user's hand. A strap 33 can fit about the back of the user's hand. The strap 33 can be a continuous loop of a hand as shown in FIG. 3. FIG. 3 also shows the device 12 diagrammatically and that a label roll R and a prior art print module or print mechanism generally indicated at 34 are disposed at a rear portion of the printer 11. The label roll R is illustrated as being comprised of a label web (or a web of labels) W received in space 35 in the housing 17. The roll R is suitably supported either at its central opening 36 or simply in a cradle 37 as shown. The web W passes from the roll R between a thermal print head 38 and a platen roll 39. The printed label web W exits the housing 17 at a slot 40 one side of which is formed by a tear edge 41.

FIG. 7 shows that the print module 34 comprises a frame 42 which has sockets 43 and 44. The module 34 includes a platen roll 45 having a shaft 46. The shaft 46 is releasably held in the sockets 43 and 44 in the FIG. 3 position. The module 34 further includes an electric motor 47 and gearing generally indicated at 48. The gearing 48 includes gear 49 on the shaft 46. Springs 50 which bear against a support 51 resiliently mount the print head 38.

Figure 2:
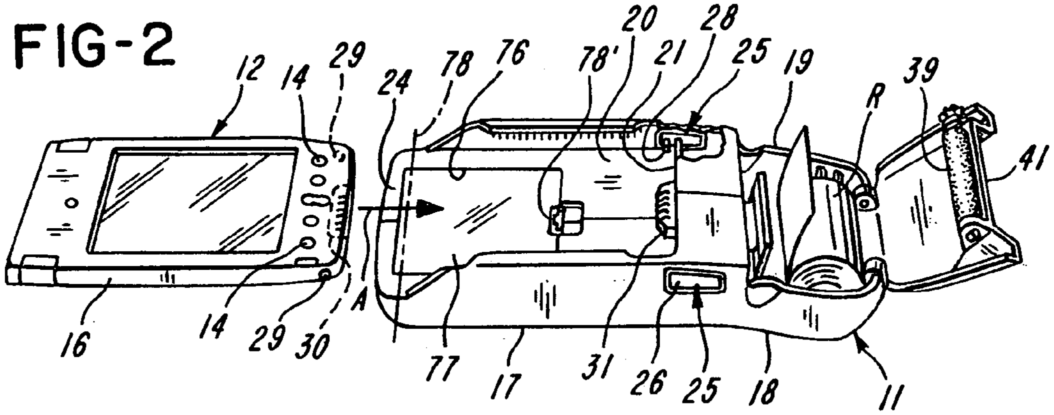
FIG. 2 is a partly exploded perspective view of the portable printer and the portable data entry device separated and with the cover open.

The platen roll 45 is rotatably mounted to a cover 52. In particular, the shaft 46 passes through a flange 53 and is removably received in a C-shaped cutout 54 in a flange 55. The end of the cover 52 opposite the platen 45 has a pair of outwardly extending projections 56 for receipt in opposed recesses 57 in the housing sections 18 and 19. Accordingly, the cover 52 is pivotally mounted for movement between a closed or operating position shown in FIGS. 1 and 3 and an open or non-operating position as illustrated in FIG. 2. It is apparent when the cover 52 is in the position shown in FIG. 2, a label roll R can be readily inserted into the space 35. If the roll R has a core C as shown the core can be readily removed. Also, the print head 38 and the platen roll 39 can be readily cleaned when the cover is in the open position. If required, the platen roll 45, its shaft 46 and its gear 49 can be readily replaced by snapping the portion of the shaft 46 between the flanges 55 and the gear 49 out of the socket 44, and pulling the other end of the shaft 46 out of the hole in the flange 53.

Figure 4:
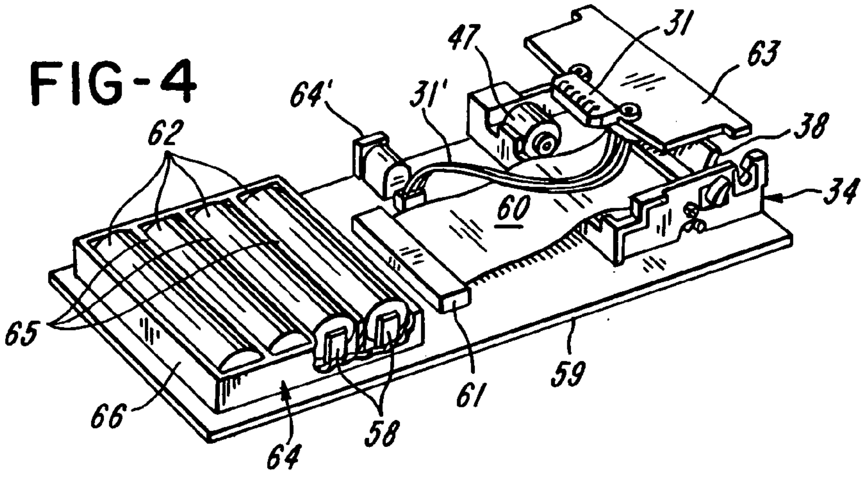
FIG. 4 is a perspective view of a printed circuit board of the printer with batteries and a print module shown mounted thereon.

As best shown in FIG. 4, the print module 34 and upstanding battery contacts 58 are mounted on a printed circuit board 59. The connector 31 is connected to the printed circuit board 59 via conductors 31'. A ribbon connector 60 connects the print head module 34, particularly the motor 47, the print head 38 and sensors (not shown) to the printed circuit board via a connector 61. There are four contacts 58 on each side of the printed circuit board 59 for releasable contact to four rechargeable batteries 62. The connector 31 which is mounted to a support 63 is connected to the printed circuit board 59. A port 64 accessible from outside the housing 17 is connected to the printed circuit board 59. The batteries 62 are held in a holder generally indicated at 64 which holds the batteries 62 in position but keep the batteries 62 from touching each other. The holder 64 maintains the batteries 62 aligned with opposed pairs of contacts 58. The holder 64 surrounds the outsides of all the batteries 62 as best shown in FIG. 4. The holder 64 has fin-like separators 65 joined to a peripheral wall 66 and to a bottom wall 67 (FIG. 3) The bottom wall 67 is connected to the printed circuit board 59 by integrally molded pins 68. The holder 64 is particularly beneficial in the event the assembly 10 or the printer 11 is dropped or otherwise impacted.

The printed circuit board 59 is captive between the housing sections 18 and 19 in transverse slots 69 and 70. The support 63 is received in slots 71 and 72. The housing sections 18 and 19 are connected by screws (not shown) received in aligned holes 74.

Floor 75 of the compartment 20 is provided with an access opening 76 which is closed off by a cover 77. The door 77 is pivotally mounted about a hinge axis 78 for movement between the closed position shown in FIG. 2 and an open potion to provide access for loading and removing the batteries 24. The cover 77 is releasably held in the closed position by a releasable latch 78'.

The printer 11 is compact, by way of example not limitation, one embodiment of the printer 11 has a length of about 8.31 inches (211 mm), a height 2.38 inches (60 mm), a width of 3.38 inches (86 mm) and a weight of 0.9 pound (0.4 kg.); and the data entry device 12 has a length of 5.46 inches (140 mm), a height of 0.66 inch (17 mm), a width of 3.16 inches (81 mm), and a weight of 6.1 ounces (0.17 kg), Other embodiments and modifications of the invention will suggest themselves to those skilled in the art, and all such of these as come within the spirit of this invention are included within its scope as best defined by the appended claims.

The invention claimed is:

1. A hand-held printer, comprising: an elongate printer housing having a portion to receive the palm of the user's hand, the housing having a front portion and a rear portion, a platen roll at the rear portion, the printer housing including a channel and flanges at opposite sides of the housing providing a compartment to embrace a portable date entry device, an electrical connector on the housing for connection to the data entry device, the housing providing space for mounting a roll of a printable web, a print module at the rear portion of the printer housing, the connector being disposed between the front portion and the roll-mounting space, the print module including a thermal print head cooperable with the platen roll for printing on the web and an electric motor for moving the platen roll, a releasable latch to latch the portable data entry device in the compartment of the printer housing, the compartment having an open top between the flanges to provide access to the portable data entry device, the compartment being open at the end of the front portion to enable a portable data entry device to be slidably received through the open end.

2. A hand-held printer as defined in claim 1, the palm-receiving portion being contoured and concave.

3. A hand-held printer as defined in claim 1, the palm-receiving portion being contoured.

4. A hand-held printer as defined in claim 3, including a strap adjacent the contoured portion.

5. A hand-held printer as defined in claim 1, wherein the palm-receiving portion of the printer housing is concave between the front portion and the rear portion.

6. A hand-held printer as defined in claim 1, including a strap connected to the printer housing and capable of passing around the back of the user's hand.

7. A hand-held printer as defined in claim 1, the housing having a pair of opposed substantially mirror-image housing sections, wherein each housing section includes one of the flanges.

8. A hand-held printer as defined in claim 7, including a printer printed circuit board supported by the housing sections.

9. A hand-held printer as defined in claim 1, wherein the print module is mounted on the printer circuit board.

10. A hand-held printer as defined in claim 9, wherein at least one battery is mounted on the printer circuit board.

11. A hand-held printer as defined in claim 1, wherein at least one battery is mounted on the printer circuit board.

12. A hand-held printer as defined in claim 1, including a printer printed circuit board supported within the housing, and wherein at least one battery is mounted on the printer circuit board.

13. A hand-held printer as defined in claim 1, including a printer printed circuit board supported within the housing, wherein the print module is mounted on the printer circuit board, and wherein at least one battery is mounted on the printer circuit board.

14. A hand-held printer as defined in claim 1, wherein the printer weighs less than 16 ounces.

15. A hand-held printer as defined in claim 1, wherein the platen roll is pivotally mounted toward and away from the print head.

16. A hand-held printer as defined in claim 1, wherein the housing includes a cover, and wherein the platen roll is pivotally mounted to the cover.

17. A hand-held printer as defined in claim 1, wherein the printer housing length is at least twice as great as the width.

18. A hand-held printer as defined in claim 1, wherein the platen roll forms part of the print module.

19. A hand-held printer as defined in claim 1, wherein the palm-receiving portion is disposed between the front and rear portions.

20. A hand-held printer as defined in claim 1, in combination with a portable data entry device.

21. A hand-held printer, comprising: an elongate housing having a front portion with a compartment adapted to receive a data entry device, the housing further having a rear portion, a platen roll, a printer printed circuit board disposed in the housing, at least one battery on the printer printed circuit board at the front portion of the housing, and a thermal print head and an electric motor for driving the platen roll being mounted to the printer circuit board.

22. A hand-held printer as defined in claim 21, wherein the compartment is shaped to overlie embracingly the sides of a data entry device, the compartment having an open top and an open front end, and an electrical connector at the rear of the compartment for connection to a data entry device.

23. A portable printer as defined in claim 21, wherein there are a plurality of adjacent batteries, a separator between each pair of adjacent batteries, and the separators being secured to the printer circuit board.

24. A hand-held printer as defined in claim 21, wherein the compartment has an open top, and an electrical connector at the rear of the compartment for connection to a data entry device.

25. A hand-held printer, comprising: an elongate housing having a front portion with an open-ended channel-shaped compartment adapted to slidably receive a data entry device through the open end of the compartment, the compartment having a substantially open top portion, the housing further having a rear portion, a printer printed circuit board disposed in the housing, the printer circuit board having a front portion and a rear portion, and a thermal print head for printing on a web and an electric motor for driving the platen roll mounted to the rear portion of the printer circuit board.

26. A hand-held printer, comprising: an elongate housing having a front portion and a rear portion, the front portion having a compartment adapted to receive a data entry device, a thermal print head and a cooperating platen roll disposed at the rear portion, an electric motor for the platen roll, a printer printed circuit board in the housing, and the print head and the electric motor being mounted on the printer circuit board.

27. In combination: a hand-held printer and a portable data entry device connected thereto, the portable data entry device including an elongate data entry device housing having a front end, a scanner disposed on the front end of the data entry device housing for scanning a code, a display and a plurality of manually operable keys, the printer including an elongate printer housing having a front portion with an open-ended channel-shaped compartment adapted to slidably receive the data entry device through the open end of the compartment and to embrace the data entry device, the scanner being capable of receiving data through the open end of the compartment and to embrace the data entry device, the compartment having opposed flanges and a substantially open top portion to enable access to the display and the keys, the printer housing further having a rear portion, a platen roll at the rear portion, a printer printed circuit board disposed in the printer housing, and a thermal print head and an electric motor for the platen roll mounted to the printer circuit board at the rear portion of the printer housing.

28. In combination: a hand-held printer and a portable data entry device connected thereto, the portable data entry device including a data entry device housing having a front end, a scanner disposed on the front end of the data entry device housing for scanning a code, a display and a plurality of manually operable keys, the printer including an elongate printer housing having a front portion and a rear portion, the front portion having a compartment adapted to receive the data entry device, a thermal print head and a cooperating rotatable platen roll disposed at the rear portion, an electric motor for the platen roll, a printer printed circuit board in the printer housing, and the print head and the electric motor being mounted on the printer circuit board at the rear portion of the printer housing.

29. In combination a hand-held printer and a portable data entry device connected thereto, the portable data entry device including a data entry device housing having a front end, a scanner disposed on the front end of the data entry device housing for scanning a code, a display and a plurality of manually operable keys, the printer including an elongate printer housing having a front portion with a compartment adapted to receive the data entry device, the housing further having a rear portion, a printer printed circuit board disposed in the housing, at least one battery on the printer circuit board at the front portion of the printer housing, a driven platen roll, a thermal print head and an electric motor for the platen roll, and the thermal print head and the electric motor being mounted to the printer circuit board at the rear portion of the printer housing.

30. A hand-held printer, comprising: an elongate housing having a front portion with an open-ended channel-shaped compartment adapted to slidably receive a data entry device through the open end of the compartment, the compartment having a substantially open top portion, the housing having a pair of opposed connected substantially mirror-image housing sections, the housing further having a rear portion, an elongate printer printed circuit board disposed in the housing and supported by the housing sections, the printer circuit board having a front portion and a rear portion, a thermal print head mounted to printer circuit board, a driven platen roll cooperable with the print head for printing on the web, and an electric motor for the platen roll mounted to the printer circuit board.

31. A hand-held printer as defined in claim 30, wherein the mirror-image housing sections receive the printed circuit board.

32. A hand-held printer as defined in claim 30, wherein the mirror-image housing sections include slots which receive the printer circuit board.

33. A hand-held printer, comprising: an elongate housing having a front portion and a rear portion, the front portion having a compartment adapted to receive a data entry device, the housing having a pair of opposed substantially mirror-image housing sections with flanges for overlying and embracing a portable data entry device, a thermal print head and a cooperating platen roll disposed at the rear portion, a printer printed circuit board supported by the housing sections, a driven platen roll, an electric motor for the platen roll, and wherein the print head and the electric motor are mounted on the printer circuit board.

34. A hand-held printer as defined in claim 33, wherein the mirror-image housing sections receive the printed circuit board.

35. A hand-held printer as defined in claim 33, wherein the mirror-image housing sections include slots which receive the printer circuit board.

36. A hand-held printer, comprising: an elongate housing having a front portion with a compartment adapted to receive a portable data entry device, the housing further having a rear portion, the housing providing space for receiving a roll of a printable web, the housing having a pair of opposed substantially mirror-image connected housing sections, a printer printed circuit board disposed in the housing and supported by the housing sections, a driven platen roll, an electric motor for the platen roll, at least one battery, a thermal print head cooperable with the platen roll, and wherein the battery and the electric motor are mounted on the printer circuit board.

37. A portable printer, comprising: an elongate housing having a front portion with an open-ended channel-shaped compartment adapted to slidably receive a data entry device through the open end of the compartment, the compartment having a substantially open top portion, the housing further having a rear portion, the housing providing internal space at the rear portion for receiving a roll of a label web, an elongate printed circuit board disposed in the housing, the printed circuit board having a front portion and a rear portion, a print module mounted to the rear portion of the printed circuit board at the rear portion of the housing, and the print module including a thermal print head and a platen roll cooperable with the print head for printing on the label web, and at least one battery in the housing, and an access opening in the housing between the compartment and the inside of the housing, the battery being accessible through the access opening.

38. A portable printer, comprising: an elongate housing having a front portion with an open-ended channel-shaped compartment adapted to slidably receive a data entry device through the open end of the compartment, the compartment having a substantially open top portion, the housing further having a rear portion, the housing providing internal space at the rear portion for receiving a roll of a label web, an elongate printed circuit board disposed in the housing, the printed circuit board having a front portion and a rear portion, a print module mounted to the rear portion of the printed circuit board at the rear portion of the housing, the print module including a thermal print head and a platen roll cooperable with the print head for printing on the label web, at least one battery in the housing, an access opening in the housing between the compartment and the inside of the housing, the battery being accessible through the access opening, and a door for the opening movable between closed and open positions.

39. In combination: a portable printer and a portable data entry device connected thereto, the portable data entry device including an elongate data entry device housing having a front end, a scanner disposed at the front end of the data entry device housing for scanning a label, a display and a plurality of manually operable keys, the printer including an elongate printer housing having a front portion with an open-ended channel-shaped compartment adapted to slidably receive the data entry device through the open end of the compartment, the scanner being capable of receiving data through the open end of the compartment, the compartment having a substantially open top portion to enable access to the display and the keys, the printer housing further having a rear portion, the printer housing providing internal space at the rear portion for receiving a roll of a label web, an elongate printed circuit board disposed in the printer housing, the printed circuit board having a front portion and a rear portion, a print module mounted to the rear portion of the printed circuit board at the rear portion of the printer housing, the print module including a thermal print head and a platen roll cooperable with the print head for printing on the label web, at least one battery in the printer housing, and an access opening in the printer housing between the compartment and the inside of the printer housing, the battery being accessible through the access opening.

40. In combination: a portable printer and a portable data entry device connected thereto, the portable data entry device including an elongate data entry device housing having a front end, a scanner disposed at the front end of the data entry device housing for scanning a label, a display and a plurality of manually operable keys, the printer including an elongate printer housing having a front portion with an open-ended channel-shaped compartment adapted to slidably receive the data entry device through the open end of the compartment, the scanner being capable of receiving data through the open end of the compartment, the compartment having a substantially open top portion to enable access to the display and the keys, the printer housing further having a rear portion, the printer housing providing internal space at the rear portion for receiving a roll of a label web, an elongate printed circuit board disposed in the printer housing, the printed circuit board having a front portion and a rear portion, a print module mounted to the rear portion of the printed circuit board at the rear portion of the printer housing, the print module including a thermal print head and a platen roll cooperable with the print head for printing on the label web, at least one battery in the printer housing, an access opening in the printer housing between the compartment and the inside of the printer housing the battery being accessible through the access opening, and a door for the opening movable between closed and open positions.

* * * * *

UNITED STATES PATENT AND TRADEMARK OFFICE
CERTIFICATE OF CORRECTION

PATENT NO. : 7,073,717 B1

APPLICATION NO. : 09/384675

DATED : July 11, 2006

INVENTOR(S) : Gregory B. Arnold and Dennis S. Prows

It is certified that error appears in the above-identified patent and that said Letters Patent is hereby corrected as shown below:

Claim 1, Col. 4, Line 14, after portable delete “date” and insert -- data --.

Claim 11, Col. 4, Line 53, delete “the” and insert -- a --.

Claim 27, Col. 5, Lines 63 and 64, delete “and to embrace the data entry device”.

Claim 29, Col. 6, Line 19, after “combination” insert a colon -- : --.

Signed and Sealed this

Seventeenth Day of October, 2006

JON W. DUDAS

*Director of the United States Patent and Trademark Office*